(12) United States Patent
Ehmann

(10) Patent No.: US 7,544,901 B2
(45) Date of Patent: Jun. 9, 2009

(54) CABLE DUCT

(75) Inventor: Bruno Ehmann, Mögglingen (DE)

(73) Assignee: ICOTEK Projekt GmbH & Co. KG, Mögglingen (DE)

( * ) Notice: Subject to any disclaimer, the term of this patent is extended or adjusted under 35 U.S.C. 154(b) by 0 days.

(21) Appl. No.: 11/718,053

(22) PCT Filed: Aug. 10, 2005

(86) PCT No.: PCT/EP2005/008673

§ 371 (c)(1),
(2), (4) Date: May 15, 2007

(87) PCT Pub. No.: WO2006/048063

PCT Pub. Date: May 11, 2006

(65) Prior Publication Data

US 2008/0093122 A1    Apr. 24, 2008

(30) Foreign Application Priority Data

Nov. 2, 2004    (DE) .................. 10 2004 053 370

(51) Int. Cl.
  *H02G 3/18*    (2006.01)

(52) U.S. Cl. ............... 174/659; 174/650; 174/653; 174/655; 174/664; 174/152 R; 16/2.1; 248/56; 439/604

(58) Field of Classification Search ........... 174/650, 174/653, 655, 656, 659, 664, 665, 134.152 R, 174/68.1, 95–99 R, 481; 16/2.1, 2.2; 248/56; 277/606; 439/604, 587, 275

See application file for complete search history.

(56) References Cited

U.S. PATENT DOCUMENTS

| 3,076,655 A | 2/1963 | Washburn, Jr. | |
| 5,806,139 A * | 9/1998 | Anderson et al. | 16/2.1 |

FOREIGN PATENT DOCUMENTS

| DE | 37 31 147 | 3/1989 |
| DE | 40 28 570 | 3/1992 |
| DE | 197 21 659 | 11/1998 |
| DE | 299 11 305 | 12/1999 |
| DE | 101 43 296 | 6/2002 |
| EP | 0 901 190 | 3/1999 |

OTHER PUBLICATIONS

English language abstract only.

* cited by examiner

*Primary Examiner*—Dhiru R Patel
(74) *Attorney, Agent, or Firm*—Baker & Daniels LLP

(57) ABSTRACT

The invention relates to a cable duct (10), includes a base body (12), which may be operationally connected to a wall opening, for example, in a switch cabinet, at least one strain reliever (14, 16) with at least one opening (18, 20) for operational housing of at least one cable. The base body (12) is made from elastically deformable material, for example, rubber or plastic, includes at least one hinged housing (30, 32) for the strain reliever (14, 16) and may be plugged into the wall opening.

18 Claims, 3 Drawing Sheets

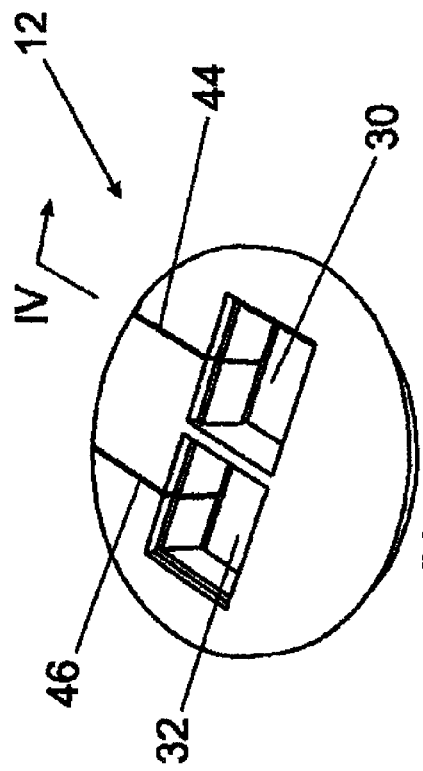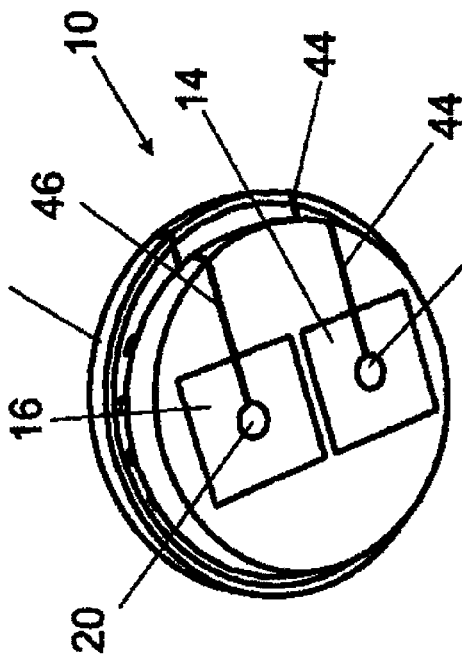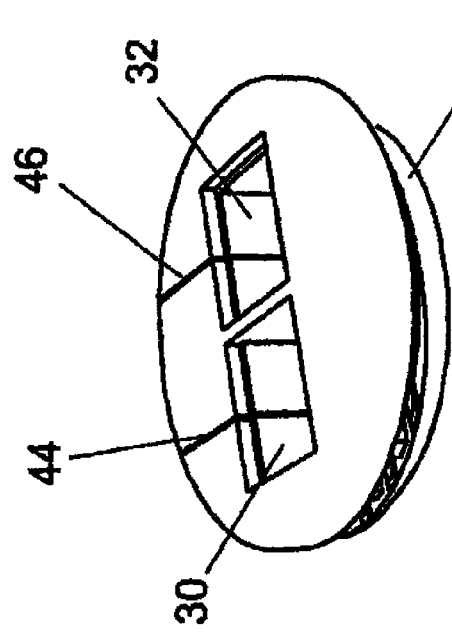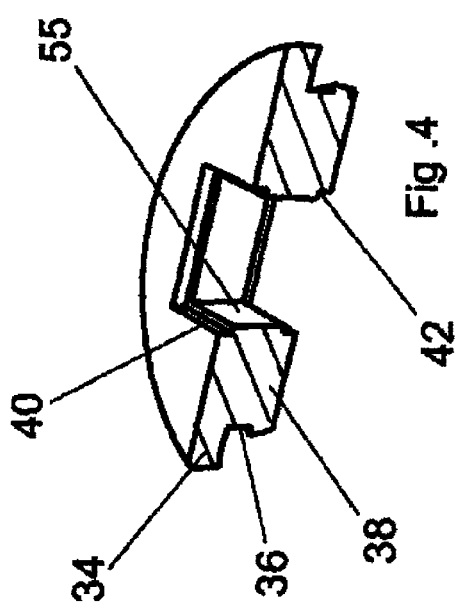

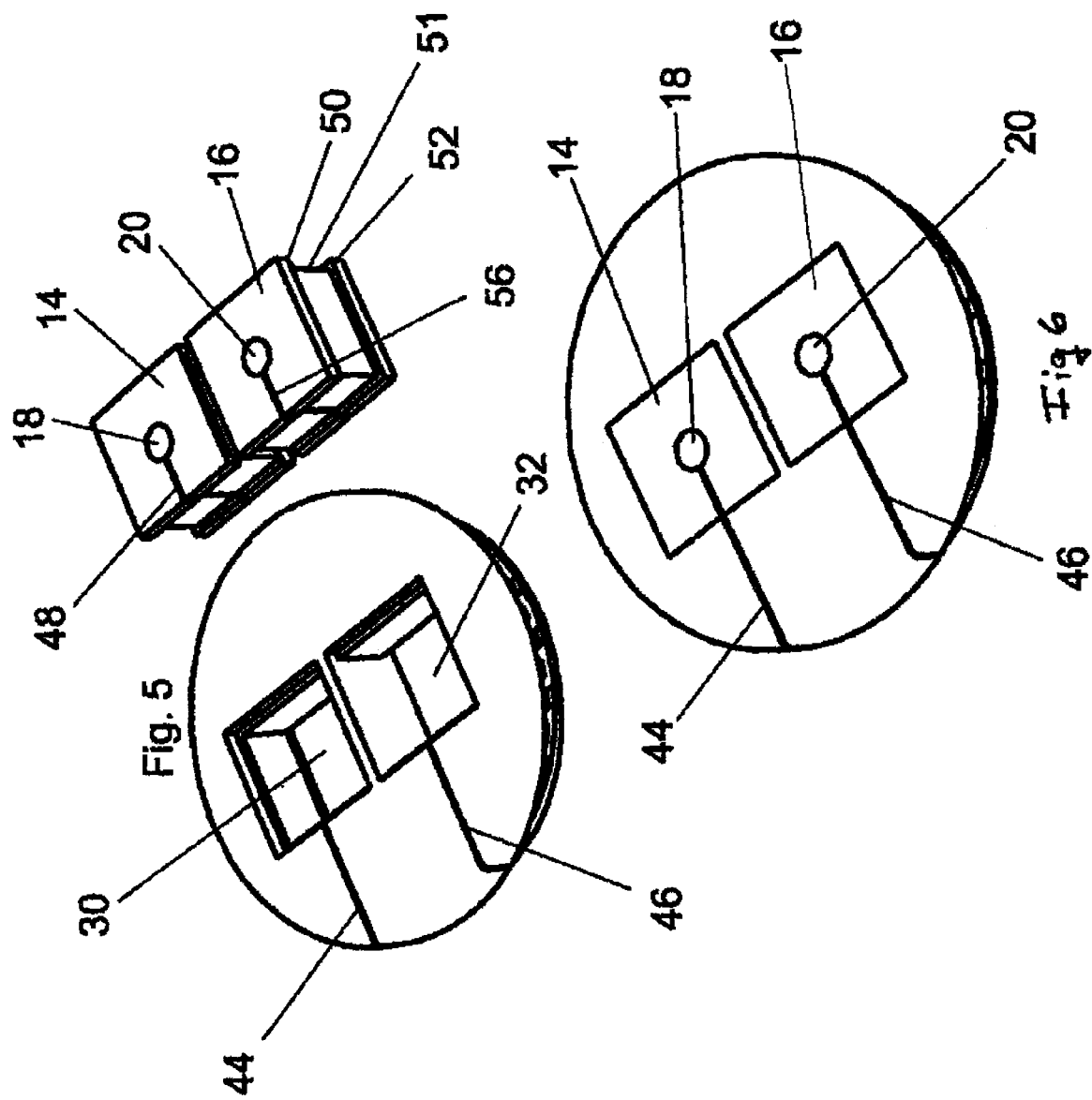

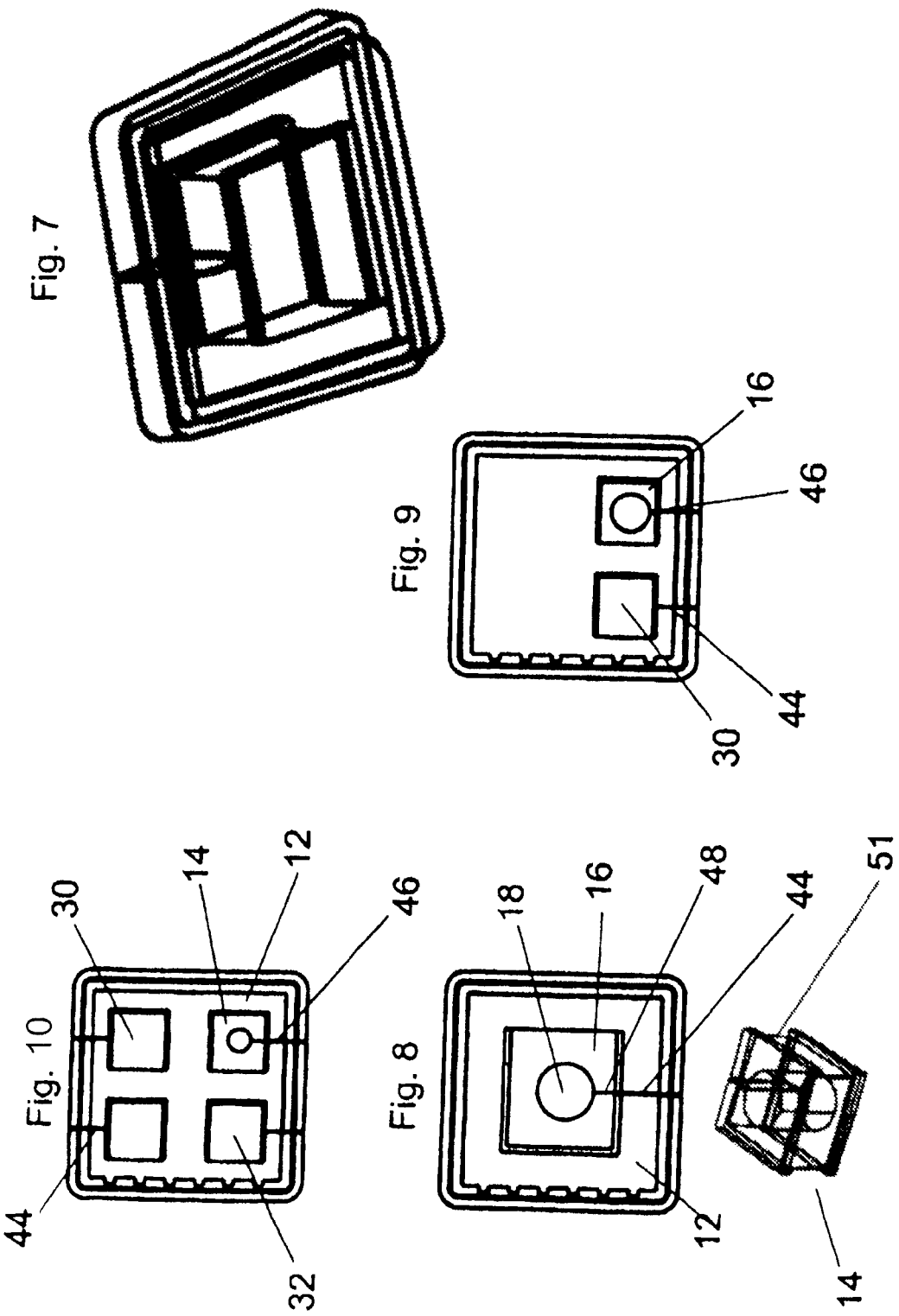

CABLE DUCT

CROSS-REFERENCE TO RELATED APPLICATION

This application is related to and claims the benefit under 35 U.S.C. §119 and 35 U.S.C. §365 of International Application No. PCT/EP2005/008673, filed Aug. 10, 2005.

BACKGROUND OF THE INVENTION

The invention relates to a cable duct which may be operationally connected to a wall opening in a switch cabinet.

In the case of cable ducts of this kind, the base body is screwed together with the outside wall of a switch cabinet, which on the one hand requires an additional tool and on the other hand the visual appearance of the switch cabinet is changed negatively.

It is the object of the present invention to simply improve the generic cable ducts in such a way that the attachment of cable ducts may occur in a simple manner and without any special tools.

SUMMARY OF THE INVENTION

The invention according to one embodiment is substantially that the base body and the strain reliever are arranged in such a way that on the one hand all parts consist of the same material and can thus be produced very easily. On the other hand, mounting does not require any further tools. Mounting of the preferably prefabricated cable duct is rather that a cable section with plugs is pushed through the wall opening and the base body is then fixed in the wall opening in order to produce a fixed connection between the base body and the wall. The circular section of the wall opening engages in a circumferential groove of the base body which deforms slightly when the base body is pressed in until an interlocking connection is produced between the two components. The material of the base body is arranged in such a way that it simultaneously fulfills two functions of the cable duct, namely the required deformability in order to introduce the base body into the wall opening, and on the other hand sufficient hardness and strength in order to tightly hold the strain reliever and the cable in an operational way. Preferably the base body and the strain reliever consist of the same material. When the cable duct is mounted, the following procedure is substantially chosen: The cable duct is preferably prefabricated, such that the cables are placed in the opened strain relievers. The closed strain relievers with the cables are then placed in the opened base body. Once the base body is closed, the cable duct is ready for operation. It can be inserted in a switch cabinet with an opening, such that the plugs or parts of the lines are placed into the wall openings first and then the base body is operationally connected with the wall opening. The configuration of the base body and the cable duct, which preferably consists of hard rubber, ensures on the one hand a fixed connection between the cable duct and the switch cabinet. On the other hand, this connection is also tight enough in order to prevent that humidity in particular will reach the switch cabinet from the outside.

Further appropriate and advantageous measures of the invention are given in the sub-claims.

BRIEF DESCRIPTION OF THE DRAWINGS

A number of embodiments of the invention are schematically shown in the drawings and will be explained below in closer detail, wherein:

FIG. 1 shows a cable duct in a perspective view;

FIG. 2 shows the cable duct shown in FIG. 1, but without any strain relievers, which means only the base body;

FIG. 3 shows the base body according to FIG. 2 in another perspective view;

FIG. 4 shows a sectional view along line IV-IV of FIG. 2;

FIG. 5 shows the cable duct according to FIG. 1 in the disassembled state;

FIG. 6 shows the cable duct according to FIG. 5 in the assembled state;

FIG. 7 shows a cable duct with a rectangular outline and rectangular openings in a perspective view;

FIG. 8 shows the cable duct according to FIG. 7 in a front view;

FIG. 10 shows a cable duct with four openings, and

FIG. 9 shows a cable duct with two openings.

DETAILED DESCRIPTION

The figures show a cable duct 10 with a base body 12 and strain relievers 14, 16, but without cables or lines. The strain relievers 14, 16 comprise openings 18, 20 for receiving cables. The cable duct can be introduced into a wall opening (not shown in closer detail) of a switch cabinet for example in an operational manner by plugging in. The wall of the switch cabinet regularly consists of sheet metal of a few mm thick, with the wall opening and the cable duct 10 being adjusted to each other insofar as it relates to the mutually corresponding dimensions. The base body 12 of the cable duct 10 consists of a deformable material, preferably rubber or plastic, and comprises two hinged housing portions 30, 32 for the strain relievers 14, 16 and can be plugged into the wall opening. The outer shape of the strain relievers 14, 16 and the shape of the housing portions 30, 32 are adjusted in such a way to each other that in the operational state the strain relievers 14, 16 are held in a non-movable and tight manner in the base body 12, i.e., by friction. Since the openings 18, 20 for the cables (not shown) are slightly smaller than their outside diameter and the housing portions 30, 32 are slightly smaller than the complementary strain relievers 14, 16, an operational pressure is exerted both on the strain relievers 14, 16 as well as the cables which ensures that the cables in the cable duct 10 are properly tightly held. The pressure acting upon the cables is aligned radially, thus acting approximately evenly on the cable. FIGS. 1 to 4 show that the base body 12 is circular in its top view, comprises a collar 34 which is dimensioned in its top view in such a way that it covers the wall opening (not shown). The base body 12 comprises an insertion section 38 which tapers in the direction of insertion in order to facilitate the insertion into the wall opening. A circular latching groove 36 is arranged in the insertion section 38 beneath collar 34, into which a complementary bordering of the wall opening can engage. The latching groove 36 can have a circular, rectangular or polygonal outline. The figures further show that the base body 12, which is circular in the top view, is radially slotted and is thus hinged. The number of slits 44, 46 corresponds regularly to the number of housing portions 30, 32. In order to achieve an operational connection between the base body 12 and the strain relievers 14, 16, the strain relievers 14, 16 comprise recesses 51 or depressions on the circumferential side which can be connected in an interlocking manner with depressions 40, 42 or recesses of a complementary shape of the base body 12. The strain relievers 14, 16 are also slotted. Their slots 48, 50 can be in alignment with the slots 44, 46 of the base body 12.

The advantages of the cable duct in accordance with the invention are especially that
- production of the complete cable duct was simplified considerably;
- preassembly of the cable ducts is considerably better than in the state of the art;
- mounting and dismounting of the cable duct can be performed without any special tools.

The invention claimed is:

1. A cable duct, comprising: a one-piece base body made of a deformable material which may be operationally connected to a wall opening in a switch cabinet, for example; at least one slotted strain reliever made of a deformable material having at least one opening for receiving at least one cable; said base body being slotted to form a hinged housing portion into which the strain reliever is received, a slit in the strain reliever being aligned with a slit forming the hinge in said base body, said base body further including an integral insertion section whereby the base body can be plugged into and secured to the wall opening.

2. A cable duct according to claim 1, wherein the strain reliever is frictionally connected with the base body.

3. A cable duct according to claim 2, wherein the base body comprises a collar which is dimensioned in its top view in such a way that it covers the wall opening.

4. A cable duct according to claim 2, wherein the base body comprises an insertion section which tapers in the direction of insertion.

5. A cable duct according to claim 1, wherein the base body is a regular geometric body in a top view such as a circle, rectangle or polygon which covers the wall opening.

6. A cable duct according to claim 5, wherein the base body comprises a collar which is dimensioned in its top view in such a way that it covers the wall opening.

7. A cable duct according to claim 5, wherein the base body comprises an insertion section which tapers in the direction of insertion.

8. A cable duct according to claim 1, wherein the base body comprises a collar which is dimensioned in its top view in such a way that it covers the wall opening.

9. A cable duct according to claim 8, wherein the base body comprises the insertion section which tapers in the direction of the insertion.

10. A cable duct according to claim 9, wherein the insertion section includes a circular latching groove arranged beneath the collar and which is adapted to engage a complementary bordering of the wall opening.

11. A cable duct according to claim 10, wherein the latching groove has a circular, rectangular, or polygonal outline.

12. A cable duct according to claim 8, wherein the base body comprises an insertion section which tapers in the direction of insertion.

13. A cable duct according to claim 1, wherein the base body is circular in its top view.

14. A cable duct according to claim 1, wherein in the operational state the strain reliever is held in a non-movable and tight manner in the base body.

15. A cable duct according to claim 1, wherein the strain reliever can receive two or more cables or lines.

16. A cable duct according to claim 1, wherein the strain relievers comprises a recess or depression on a circumferential side which can be connected in an interlocking manner with depressions or recesses of complementary shape in the base body housing portion.

17. A cable duct according to claim 1, wherein the strain relievers consists of the same or similar material as the base body.

18. A cable duct according to claim 1, wherein the base body is a regular geometric body in a top view as one of a circle, rectangle or polygon which covers the wall opening.

* * * * *

UNITED STATES PATENT AND TRADEMARK OFFICE
CERTIFICATE OF CORRECTION

PATENT NO. : 7,544,901 B2
APPLICATION NO. : 11/718053
DATED : June 9, 2009
INVENTOR(S) : Bruno Ehmann It is certified that error appears in the above-identified patent and that said Letters Patent is hereby corrected as shown below:

Claim 4, Column 3, Line 27, delete "an" and insert --the--

Claim 16, Column 4, Line 24, delete "relievers" and insert --reliever--

Claim 17, Column 4, Line 30, delete "relievers" and insert --reliever--

Signed and Sealed this

First Day of September, 2009

David J. Kappos
*Director of the United States Patent and Trademark Office*